(12) United States Patent
Grichnik et al.

(10) Patent No.: US 8,185,359 B2
(45) Date of Patent: May 22, 2012

(54) SYSTEM AND METHOD FOR TRANSFORMING DATA BETWEEN THE TIME DOMAIN AND THE COMBUSTION PULSE DOMAIN

(75) Inventors: Anthony J. Grichnik, Peoria, IL (US); Timothy J. Felty, Peoria, IL (US); James R. Mason, Peoria, IL (US); Amit Jayachandran, Peoria, IL (US); Mary Lou Kesse, Hanna City, IL (US); Christopher L. Wynkoop, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 581 days.

(21) Appl. No.: 12/216,405

(22) Filed: Jul. 3, 2008

(65) Prior Publication Data

US 2010/0004901 A1    Jan. 7, 2010

(51) Int. Cl.
*G06F 15/00* (2006.01)
*H03F 1/26* (2006.01)

(52) U.S. Cl. ............. 702/198; 73/593; 73/660; 702/145

(58) Field of Classification Search .................... 702/32, 702/33, 104, 105, 113, 125, 126, 189, 198, 702/145; 73/23.31, 114, 114.32, 593, 660; 324/173; 340/870.2; 701/108, 111, 114; 123/406.53, 488; 700/30
See application file for complete search history.

(56) References Cited

U.S. PATENT DOCUMENTS

| | | | |
|---|---|---|---|
| 4,229,793 A | 10/1980 | Yoshida et al. | |
| 4,380,983 A | 4/1983 | Kobashi et al. | |
| 4,633,838 A | 1/1987 | Fukui | |
| 4,748,447 A | 5/1988 | Oshizawa | |
| 4,757,454 A | 7/1988 | Hisatake et al. | |
| 4,836,016 A | 6/1989 | Nakano et al. | |
| 5,365,787 A * | 11/1994 | Hernandez et al. | 73/660 |
| 5,511,422 A * | 4/1996 | Hernandez | 73/593 |
| 5,639,957 A | 6/1997 | Zarchy | |
| 5,708,585 A | 1/1998 | Kushion | |
| 7,128,818 B2 | 10/2006 | Khesin et al. | |
| 2004/0236494 A1 | 11/2004 | DeBotton et al. | |
| 2008/0012551 A1 | 1/2008 | Endo et al. | |
| 2009/0118841 A1 | 5/2009 | Grichnik et al. | |

OTHER PUBLICATIONS

Wikipedia article entitled "The Miller Cycle" accessed May 6, 2008 (2 pages).
How Stuff Works article entitled "How does a Miller-cycle engine work?" accessed May 6, 2008 (1 page).
How Stuff Works article entitled "How Diesel Engines Work" accessed May 6, 2008 (5 pages).
How Stuff Works article entitled "How Diesel Two-Stroke Engines Work" accessed May 6, 2008 (3 pages).
AutoWeek Article by Pete Lyons accessed May 22, 2008 (3 pages).

* cited by examiner

*Primary Examiner* — John H Le
(74) *Attorney, Agent, or Firm* — Finnegan, Henderson, Farabow, Garrett & Dunner LLP

(57) ABSTRACT

A method for transforming machine sensor data between a time domain and a combustion pulse domain is disclosed. The method may include determining a number of pulse events per rotation of a shaft and determining a sampling rate per pulse event. The method may also include sampling one or more sensors at the sampling rate per pulse event. The method also may include transforming the samples into the combustion pulse domain.

19 Claims, 6 Drawing Sheets

SYSTEM AND METHOD FOR TRANSFORMING DATA BETWEEN THE TIME DOMAIN AND THE COMBUSTION PULSE DOMAIN

TECHNICAL FIELD

This disclosure relates generally to transforming data and, more particularly, to a system and method for transforming data between the time domain and the combustion pulse domain.

BACKGROUND

Physical sensors are widely used in many products, such as modern machines, to measure and monitor physical phenomena, such as temperature, speed, and airborne emissions from motor vehicles. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of an intake manifold pressure sensor in an engine may result in shutdown of the engine entirely even if the engine itself is still operable.

Conventional data acquisition systems capture sensed values on either time intervals (at a certain frequency) or when manually triggered (as by a key phasor signal on a rotating shaft). Models of airborne emissions from internal combustion engines are generally fitted to data in the time domain at fixed intervals. However, because the engine could be operating at different speeds at different points in time, the amount of airborne emissions is not constant with respect to time. Further, because of nonlinear effects in the system from components like turbochargers, intercoolers, and the like, the rotational domain is not appropriate either. A virtual sensor network using models of airborne emissions from internal combustion engines in the time domain are often nonlinear in nature, and difficult to compute.

Instead of modeling in the time domain or frequency domain, it may be possible to transform the data into a pulse domain. In vibration theory, some analysis may be changed from a time domain approach to a shaft speed approach for certain types of modeling, pattern recognition, and virtual sensing. For example, U.S. Patent Publication No. 2004/0236494 (the '494 publication) to DeBotton et al., published on Nov. 25, 2004, discloses a method and system for diagnosing the health-condition of engines. The '494 publication uses the harmonic terms of the Fourier series representation of the engine vibration and correlates them with the mechanical state of the engine. When one of the cylinders is malfunctioning in some way, it generates a disturbance in the original ideal vibration waveform of the engine. The disturbance may appear as an increase or a decrease in the magnitude of the oscillation associated with the combustion process in the cylinder, as a variation of the waveform contour or profile, or usually as a combination of both. A malfunctioning cylinder may be detected by monitoring the magnitude and waveform contour or profile of the harmonic terms of the Fourier series representation of the engine vibration while correlating them with the mechanical state of the engine.

Although the method and system of the '494 publication may be useful for diagnosing the health-condition of engine systems and may detect malfunctioning cylinders, it still has several shortcomings. For example, the method and system of the '494 publication are useful for detection of engine state of health, but are not disclosed as useful for modeling of airborne emissions from internal combustion engines. Additionally, the method and system of the '494 publication are designed to monitor the vibration response in the frequency domain rather than to monitor airborne emissions in the combustion pulse domain. The method and system of the '494 publication do not disclose offsetting measurements for the varying shift in time for exhaust products to exit the exhaust system. A further drawback of the method and apparatus of the '494 publication is an inability to transform the modeling results back into the time domain for further use by an Electronic Control Module (ECM) or other systems or models. Additionally, the method and apparatus of the '494 publication may not allow further use of the modeling results in the combustion pulse domain by an ECM or other systems or models.

The disclosed system and method are directed to improvements in the existing technology.

SUMMARY

One aspect of the present disclosure includes a method for transforming machine sensor data between a time domain and a combustion pulse domain. The method may include determining a number of pulse events per rotation of a shaft and determining a sampling rate per pulse event. The method may also include sampling one or more sensors at the sampling rate per pulse event. Further, the method may include transforming the samples into the combustion pulse domain.

Another aspect of the present disclosure includes a system for a machine including an engine with a rotary shaft, configured to transform machine sensor data between a time domain and a combustion pulse domain. The system may include a sensor deployed on the machine, an input interface configured to obtain data from the sensor deployed on the machine, and an output interface configured to provide data to a control system. The system may also include a controller. The controller may determine a number of pulse events per rotation of the rotary shaft and determine a sampling rate per pulse event. The controller may also sample one or more sensors at the sampling rate per pulse event. Further, the controller may transform the samples into the combustion pulse domain.

Another aspect of the present disclosure includes a machine. The machine may include an engine with a rotating shaft configured to provide power for the machine, an engine electronic control module (ECM) configured to control the engine, and a plurality of physical sensors configured to provide sensing data to the engine ECM. The machine may also include an input interface configured to obtain data from the plurality of physical sensors deployed on the machine and an output interface configured to provide data to a control system. The machine may further include a controller. The controller may be configured to determine a number of pulse events per rotation of a shaft and to determine a sampling rate per pulse event. The controller may also be configured to sample one or more of the physical sensors at the sampling rate per pulse event. The controller may be further configured to transform the samples into the combustion pulse domain.

DETAILED DESCRIPTION

Figure 1:
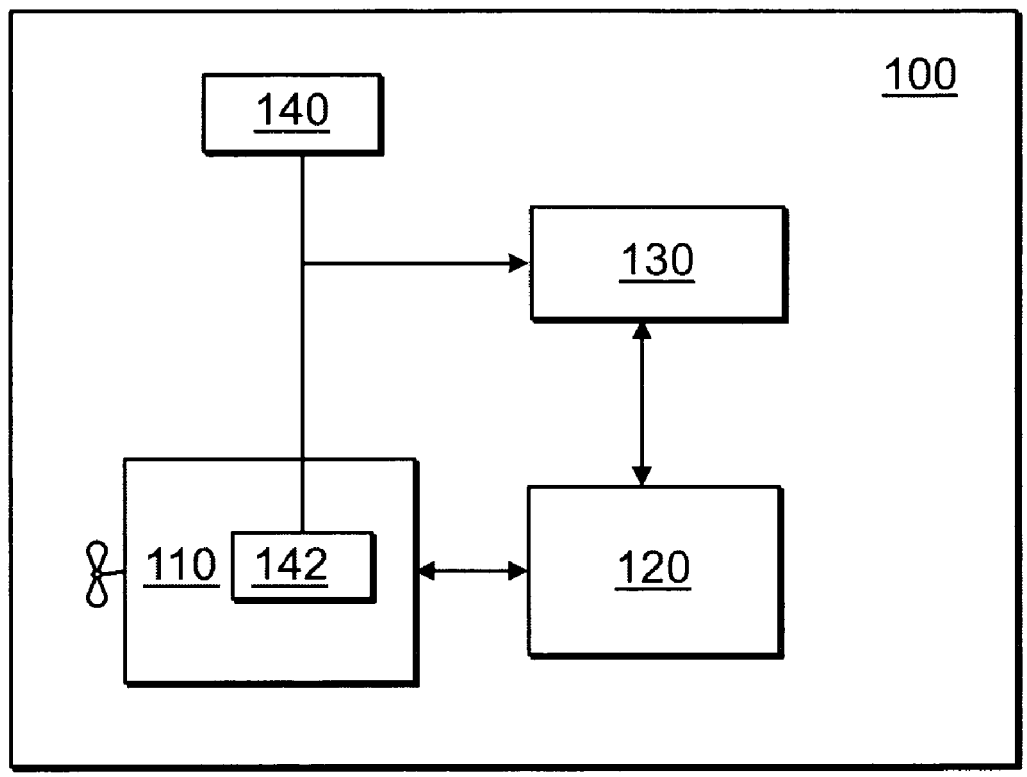
FIG. 1 illustrates an exemplary block diagram of a machine in which features and principles consistent with certain disclosed embodiments may be incorporated.

FIG. 1 illustrates an exemplary machine 100 in which features and principles consistent with certain disclosed embodiments may be incorporated. Machine 100 may refer to any type of stationary or mobile machine that performs some type of operation associated with a particular industry. Machine 100 may also include any type of commercial vehicle such as cars, vans, and other vehicles. Other types of machines may also be included.

As shown in FIG. 1, machine 100 may include an engine 110, an electronic control module (ECM) 120, a virtual sensor network system 130, and physical sensors 140 and 142. Engine 110 may include any appropriate type of reciprocating engine that generates power for machine 100, such as a diesel engine, a gasoline engine, or a natural gas engine.

ECM 120 may include any appropriate type of engine control system configured to perform engine control functions such that engine 110 may operate properly. ECM 120 may include any number of devices, such as microprocessors or microcontrollers, FPGAs, ASICs, memory modules, communication devices, input/output devices, storages devices, etc., to perform such control functions. Further, computer software instructions may be stored in or loaded to ECM 120. ECM 120 may execute the computer software instructions to perform various control functions and processes. Although ECM 120 is shown to control engine 110 (an engine ECM), ECM 120 may also control other systems of machine 100, such as transmission systems, and/or hydraulics systems. Multiple ECMs may be included in ECM 120 or may be used on machine 100. For example, a plurality of ECMs may be used to control and coordinate the different systems of machine 100, and may use one or more datalink communication lines to connect two or more ECM's together.

Physical sensor 140 may include one or more sensors provided for measuring certain parameters of the operating environment of machine 100. For example, physical sensor 140 may include physical emissions sensors for measuring airborne emissions of machine 100, such as Nitrogen Oxides ($NO_x$), Sulfur Dioxide ($SO_2$), Carbon Monoxide (CO), total reduced Sulfur (TRS), etc. In particular, $NO_x$ emissions sensing and reduction may be of interest to normal operation of engine 110. Physical sensor 142, on the other hand, may include any appropriate sensors that are used with engine 110 or other machine components (not shown) to provide various measured parameters about engine 110 or other components, such as temperature, speed, acceleration rate, fuel pressure, and power output.

Virtual sensor network system 130 may be coupled with physical sensors 140 and 142 and ECM 120 to provide control functionalities based on integrated virtual sensors. A virtual sensor, as used herein, may refer to a mathematical algorithm or model that produces output measures comparable to a physical sensor based on inputs from other systems, such as physical sensors 140 and 142. For example, a physical $NO_x$ emissions sensor may measure the $NO_x$ emissions level of machine 100 and provide values of $NO_x$ emissions level to other components, such as ECM 120; while a virtual $NO_x$ emissions sensor may provide calculated values of $NO_x$ emissions level to ECM 120 based on other measured or calculated parameters, such as compression ratios, turbocharger efficiency, aftercooler characteristics, temperature values, pressure values, ambient conditions, fuel rates, and engine speeds. The term "virtual sensor" may be used interchangeably with "virtual sensor model."

A virtual sensor network, as used herein, may refer to a collection of virtual sensors integrated and working together using certain control algorithms such that the collection of virtual sensors may provide more desired or more reliable sensor output parameters than discrete individual virtual sensors. Virtual sensor network system 130 may include a plurality of virtual sensors configured or established according to certain criteria based on a particular application. Virtual sensor network system 130 may also facilitate or control operations of the plurality of virtual sensors. The plurality of virtual sensors may include any appropriate virtual sensor providing sensor output parameters corresponding to one or more physical sensors in machine 100.

Figure 2:
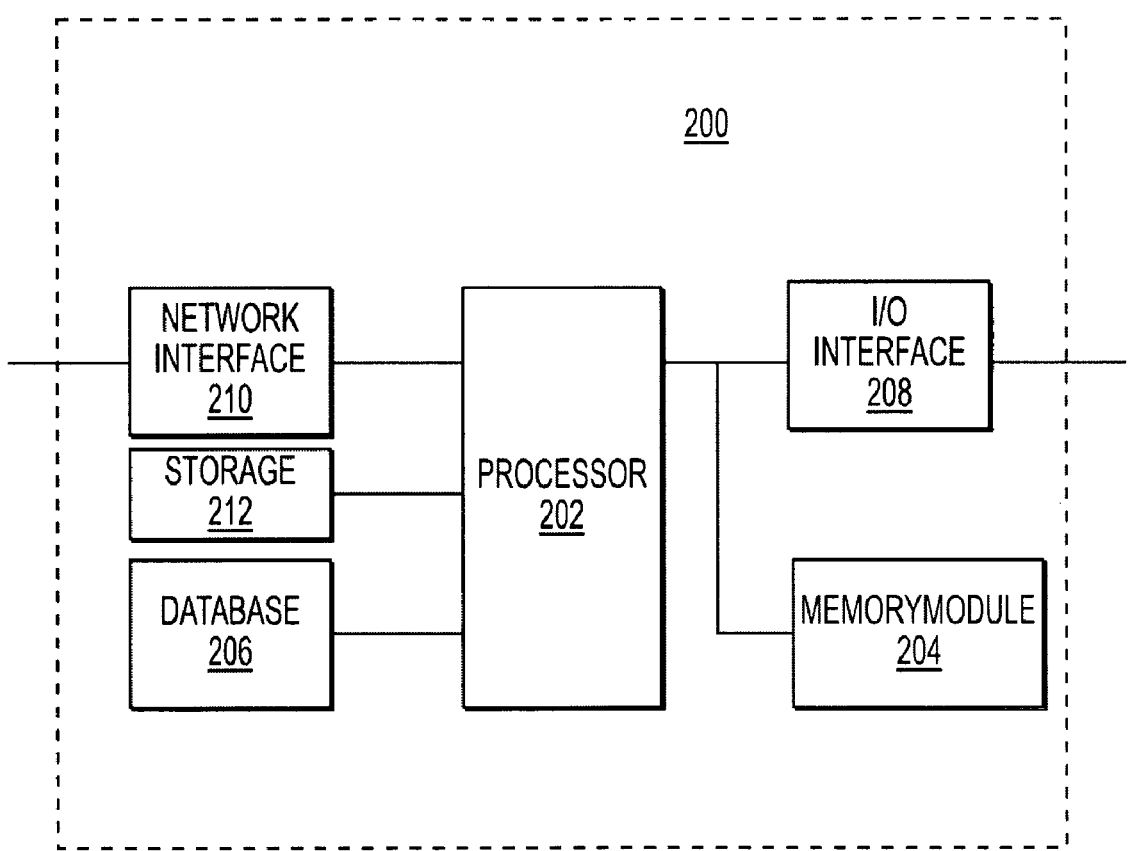
FIG. 2 illustrates a logical block diagram of an exemplary computer system consistent with certain disclosed embodiments.

Further, virtual sensor network system 130 may be configured as a separate control system or, alternatively, may coincide with other control systems such as ECM 120. Virtual sensor network system 130 may also operate in series with or in parallel to ECM 120. Virtual sensor network system 130 and/or ECM 120 may be implemented by any appropriate computer system. FIG. 2 shows an exemplary functional block diagram of a computer system 200 configured to implement virtual sensor network system 130 and/or ECM 120. Computer system 200 may also include any appropriate computer system configured to design, train, and validate virtual sensors in virtual sensor network 130 and other component of machine 100.

As shown in FIG. 2, computer system 200 (e.g., virtual sensor network system 130, etc.) may include a processor 202, a memory module 204, a database 206, an I/O interface 208, a network interface 210, and storage 212. Other components, however, may also be included in computer system 200.

Processor 202 may include any appropriate type of general purpose microprocessor, digital signal processor, microcontroller, FPGA, or ASIC. Processor 202 may be configured as a separate processor module dedicated to controlling engine 110. Alternatively, processor 202 may be configured as a shared processor module for performing other functions unrelated to virtual sensors.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of measured parameters, sensing parameters, mathematical models, and/or any other control information.

Further, I/O interface 208 may also be configured to obtain data from various sensors or other components (e.g., physical sensors 140 and 142) and/or to transmit data to these components and to ECM 120. Network interface 210 may include any appropriate type of network device capable of communicating with other computer systems based on one or more wired or wireless communication protocols. Storage 212 may include any appropriate type of mass storage provided to store any type of information that processor 202 may use to operate. For example, storage 212 may include one or more hard disk devices, optical disk devices, or other storage devices to provide storage space.

Figure 3:
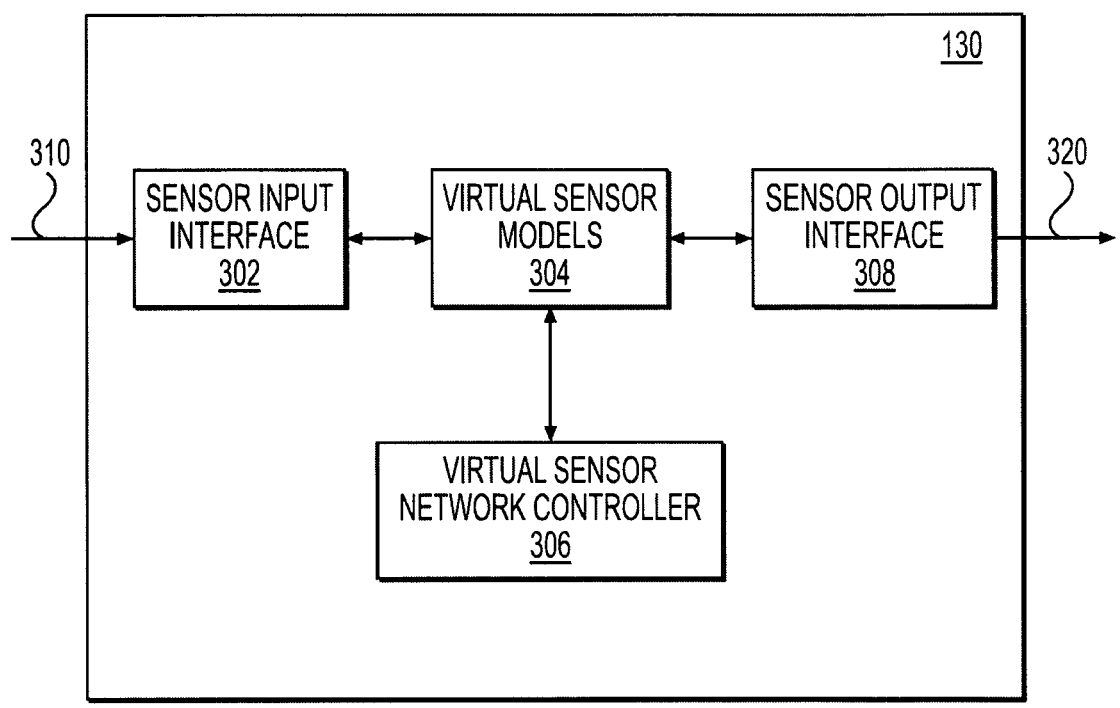
FIG. 3 illustrates a block diagram of an exemplary virtual sensor network system consistent with certain disclosed embodiments.

FIG. 3 shows a functional block diagram of virtual sensor network system 130 consistent with the present disclosure. As shown in FIG. 3, virtual sensor network system 130 may include a sensor input interface 302, virtual sensor models 304, a virtual sensor network controller 306, and a sensor output interface 308. Input parameters 310 are provided to sensor input interface 302 and output parameters 320 are provided by sensor output interface 308.

Sensor input interface 302 may include any appropriate interface, such as an I/O interface or a data link, configured to obtain information from various physical sensors, such as physical sensors 140 and 142. The information may include values of input or control parameters of the physical sensors, operational status of the physical sensors, and/or values of output parameters of the physical sensors. Further, the information may be provided to sensor input interface 302 as input parameters 310.

Virtual network controller 306 may monitor the status of virtual sensor models 304 and corresponding physical sensors, determine the fitness of individual virtual sensors of virtual sensor models 304, determine the fitness of virtual sensor models 304 collectively, control operation of individual virtual sensors of virtual sensor models 304, and/or report status to other computer programs or control systems, etc.

Sensor output interface 308 may include any appropriate interface, such as an I/O interface or a datalink interface, configured to provide information from virtual sensor models 304 and virtual sensor network controller 306 to external systems, such as ECM 120, or to an external user of virtual sensor network 130. The information may be provided to external systems and/or users as output 320.

Virtual sensor models 304 may include a plurality of virtual sensors, such as virtual airborne emissions sensors, virtual fuel sensors, and virtual speed sensors. Any virtual sensor may be included in virtual sensor models 304.

One or more virtual sensor models of airborne emissions sensors may be used instead of one or more physical sensors 140. Computational resources required by a virtual sensor model may be reduced for an airborne emissions virtual sensor by transforming the inputs from physical sensors 142 into the combustion pulse domain, modeling the virtual sensor output, then transforming the result back into the time domain for use in other virtual sensors or by ECM 120. Additionally, the results may be used as inputs in the combustion pulse domain by other virtual sensors or by ECM 120.

The combustion pulse domain may measure the sequential progression of events in terms of pulse events. A key phasor transform, which may be tied to the rotation of a crank shaft, measures its sequential axis in terms of rotation of the crank shaft. The combustion pulse domain differs from a key phasor transform because, depending on the number of cylinders and engine type, the number of pulse events per rotation may be different for different engines. A combustion pulse transform is tied to the pulse events per rotation, such as the cylinder firing, and not to time or angular position of the crank shaft. It should be noted, while rotation of a crank shaft is used, rotation of a crank shaft may include both the crankshaft or any other gear in machine 100 suitable for measuring the sequential progression of events in terms of pulse events.

Figure 4:
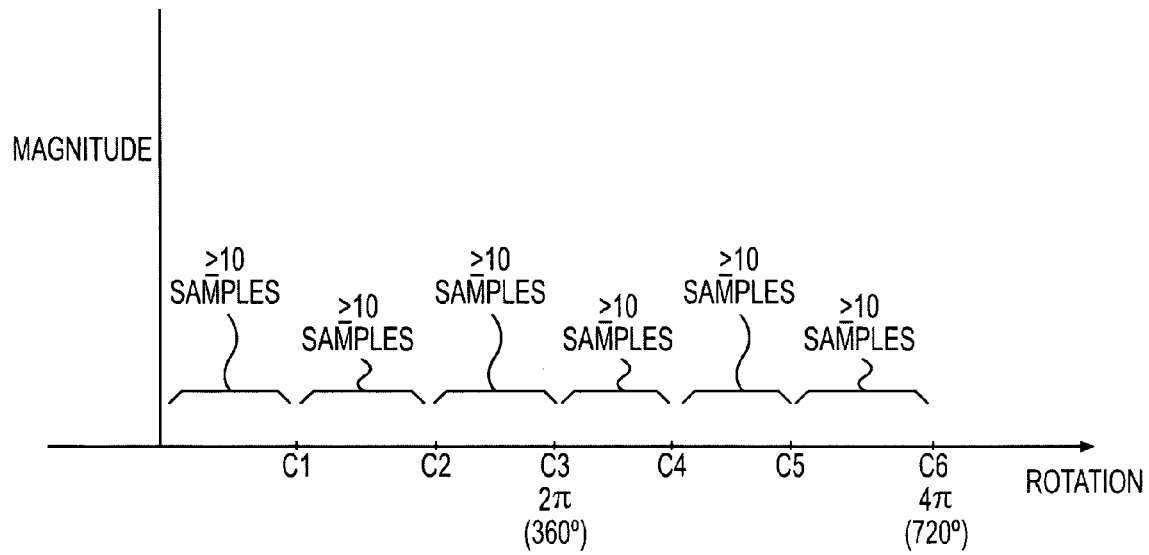
FIG. 4 illustrates an exemplary embodiment of a cycle of a 4 stroke, 6 cylinder engine consistent with certain disclosed embodiments.

In the exemplary embodiment of FIG. 4, a four stroke, six cylinder engine is shown. The four strokes may be intake, compression, power, and exhaust. Each cylinder may perform all four strokes once per every two rotations of the crank shaft. The example of FIG. 4 may be consistent with a Diesel or Otto cycle engine. For load balancing, each cylinder may complete its cycle at equidistant arcs over the 720 degrees of two rotations of the crank shaft. The firing of a cylinder may be a pulse event. In the example of FIG. 4, a cylinder may fire every 120 degrees of rotation of the crank shaft. After 120 degrees, Cylinder 1 (C1) may fire, after 240 degrees, Cylinder 2 (C2) may fire, after 360 degrees, Cylinder 3 (C3) may fire, after 480 degrees, Cylinder 4 (C4) may fire, after 600 degrees, Cylinder 5 (C5) may fire, and, after 720 degrees, Cylinder 6 (C6) may fire. The firing order is for exemplary purposes to show the separation in degrees between successive firings of cylinders, the actual firing order may be C1, C5, C3, C6, C2, C4. In one exemplary embodiment, at least ten samples are taken every 120 degrees, and at least thirty samples are taken every rotation of the crank shaft.

Figure 5:
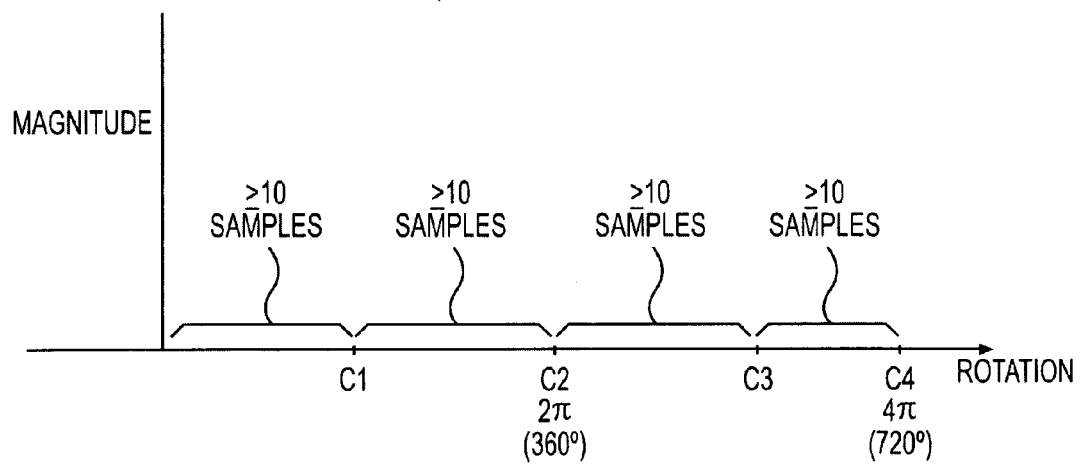
FIG. 5 illustrates an exemplary embodiment of a cycle of a 4 stroke, 4 cylinder engine consistent with certain disclosed embodiments.

In the exemplary embodiment of FIG. 5, a four stroke, four cylinder engine is shown. Again, the four strokes may be intake, compression, power, and exhaust. Each cylinder may perform all four strokes once per every two rotations of the crank shaft. The example of FIG. 5 may be consistent with a Diesel or Otto cycle engine. For load balancing, each cylinder may complete its cycle at equidistant arcs over the 720 degrees of two rotations of the crank shaft. In the example of FIG. 5, a cylinder may fire every 180 degrees of rotation of the crank shaft. The firing of a cylinder may be a pulse event. After 180 degrees, Cylinder 1 (C1) may fire, after 360 degrees, Cylinder 2 (C2) may fire, after 540 degrees, Cylinder 3 (C3) may fire, and, after 720 degrees, Cylinder 4 (C4) may fire. The firing order is for exemplary purposes to show the separation in degrees between successive firings of cylinders, the actual firing order may be C1, C3, C4, C2. In one exemplary embodiment, at least ten samples are taken every 180 degrees, and at least twenty samples are taken every rotation of the crank shaft.

Figure 6:
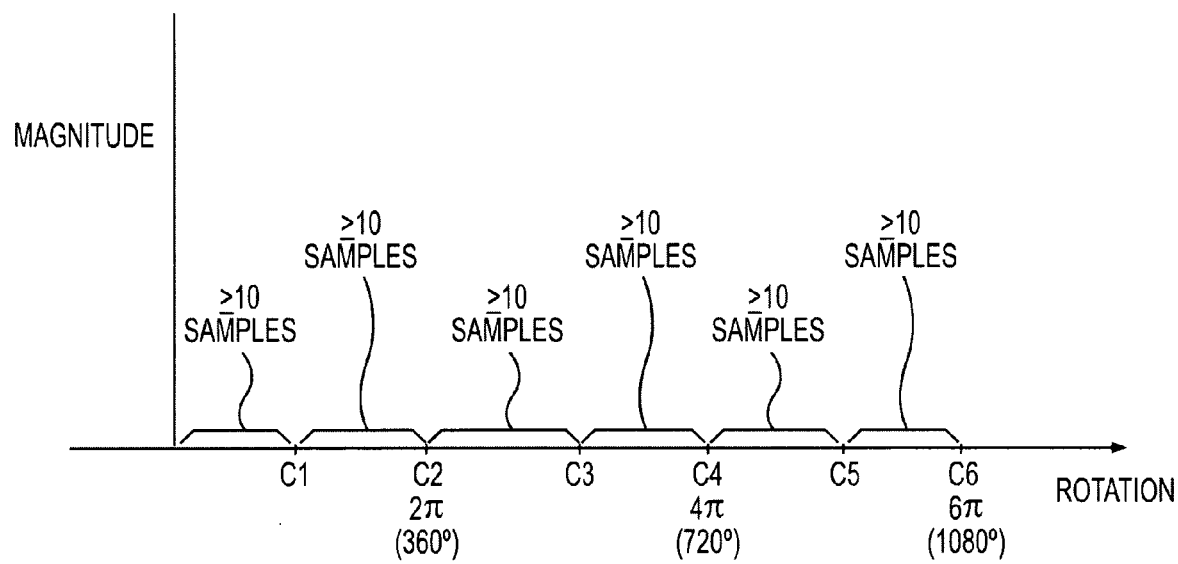
FIG. 6 illustrates an exemplary embodiment of a cycle of a 6 stroke, 6 cylinder engine consistent with certain disclosed embodiments.

In the exemplary embodiment of FIG. 6, a non-four stroke Miller-cycle engine may be used. Miller-cycle engines may be used for low heating value fuels, such as natural gas. Many Miller cycle engines have only four strokes and take two rotations of a crank shaft for a cylinder to complete the Miller-cycle. A non-four stroke Miller-cycle engine may take three rotations of a crank shaft for a cylinder to complete the Miller-cycle. A non-four stroke Miller-cycle engine may take six strokes to complete the cycle. The six strokes may be intake, compression, expansion, recompression, power, and exhaust. Each cylinder may perform all six strokes once per every three rotations of the crank shaft. For load balancing, each cylinder may complete its cycle at equidistant arcs over the 1080 degrees of three rotations of the crank shaft. In the example of FIG. 6, a cylinder may fire every 180 degrees of rotation of the crank shaft. The firing of a cylinder may be a pulse event. After 180 degrees, Cylinder 1 (C1) may fire, after 360 degrees, Cylinder 2 (C2) may fire, after 540 degrees, Cylinder 3 (C3) may fire, after 720 degrees, Cylinder 4 (C4) may fire, after 900 degrees, Cylinder 5 (C5) may fire, and, after 1080 degrees, Cylinder 6 (C6) may fire. The firing order is for exemplary purposes to show the separation in degrees between successive firings of cylinders, the actual firing order may be C1, C5, C3, C6, C2, C4. In one exemplary embodiment, at least ten samples are taken every 180 degrees, and at least twenty samples are taken every rotation of the crank shaft.

Figure 7:
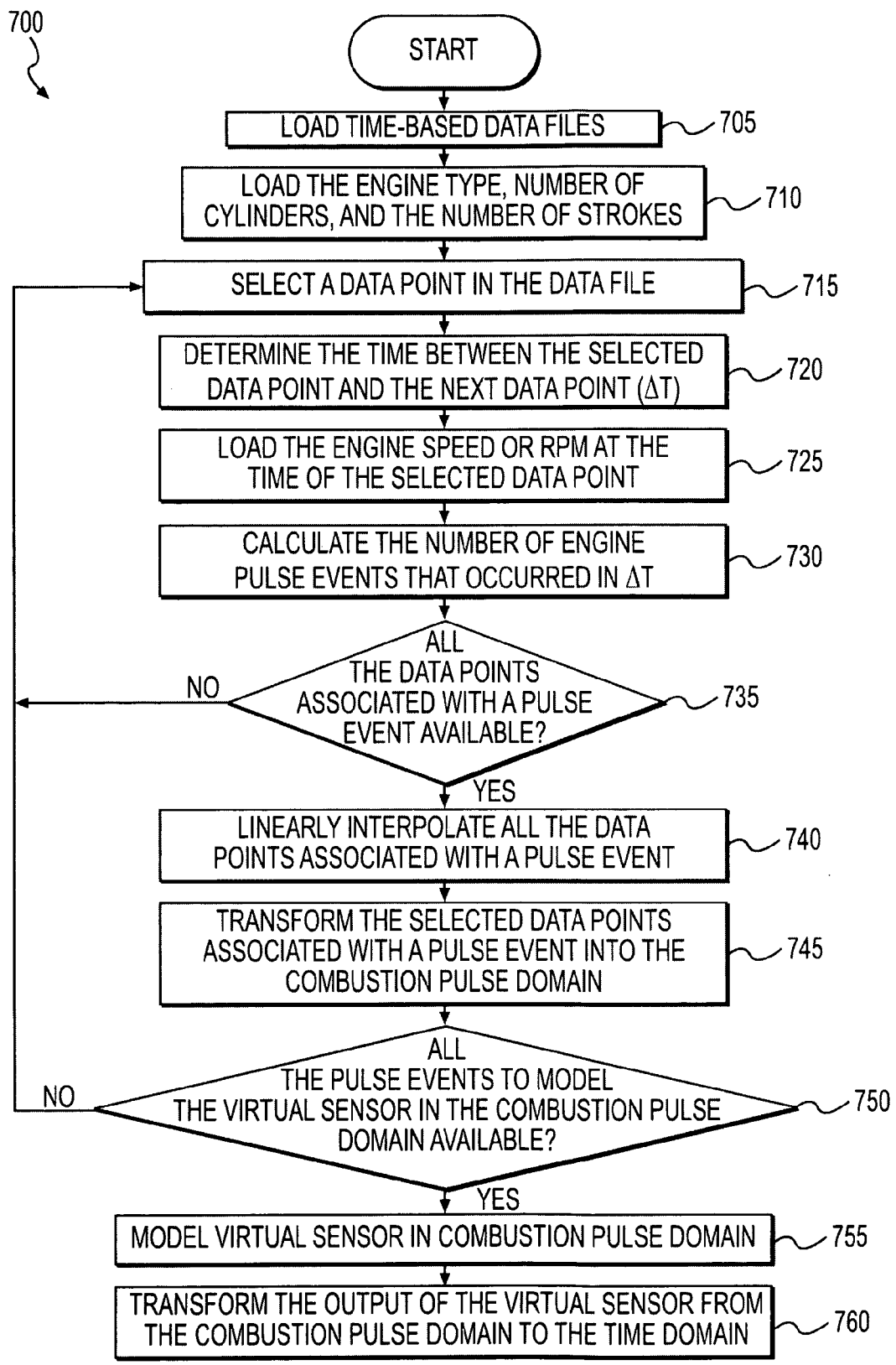
FIG. 7 illustrates a flowchart of an exemplary process to convert a physical sensor data file into the combustion pulse domain, model a virtual sensor in the combustion pulse domain, and covert the output of the virtual sensor back into the time domain, consistent with certain disclosed embodiments.

FIG. 7 illustrates an exemplary flowchart 700 of a process to convert a physical sensor data file into the combustion pulse domain, model a process, such as a virtual sensor, in the combustion pulse domain, and covert the output of the modeled process back into the time domain.

In one exemplary embodiment, to recreate the waveform from the samples, at least 2.1 samples per pulse event may be taken to meet the Nyquist criteria. In another exemplary embodiment, at least 10 samples per pulse event may be taken to allow reconstruction of the original time domain signal. Samples may measure the magnitude of a value detected by a sensor 140 or 142, taken at a particular time. The particular time may be determined based on the type of engine, number of strokes and cylinders, and the engine speed or RPM (Rotations per minute).

As shown in FIG. 7, in step 705, computer system 200, or processor 202, may load time-based data files corresponding to the output of one or more physical sensors 140 and 142 or virtual sensors. The data files may include, for example, information characterizing engine 110 operations and airborne emissions levels including $NO_x$ emissions levels. ECM 120 and/or physical sensors 140 and 142, such as physical $NO_x$ emissions sensors, may be provided to generate data files, such as intake manifold temperature, intake manifold pressure, ambient humidity, fuel rates, and engine speeds. The data files may be sorted in time order, from the earliest entry in time to the latest.

Further, the data files may be collected based on various operational engines 110, such as real-time data from an embedded system, or based on a single test engine 110, under various predetermined operational conditions. The data files may also be collected from experiments designed for collecting such data. Alternatively, the data files may be generated artificially by other related processes, such as other airborne emissions modeling, simulation, or analysis processes.

In step 710, after obtaining the data files in step 705, processor 202 may load the engine 110 type, number of cylinders, and the number of strokes per cycle of each cylinder. The engine 110 type, number of cylinders, and the number of strokes per cycle of each cylinder may permit processor 202 to determine the number of pulse events per rotation of a crank shaft. The pulse event rate may be the number of pulse events per rotation of a crank shaft. It should be noted, while rotation of a crank shaft is used, rotation of a crank shaft may include both the crankshaft or any other gear in machine 100 suitable for measuring the sequential progression of events in terms of pulse events.

In step 715, processor 202 may select a data point in the data file loaded in step 705. The selected data point may be a data point earliest in time in the data file that has not already been selected. A data point may be the magnitude of the output of one or more sensors. A data point may include additional information, such as a time stamp, that is, the time when the sample was taken, the time stamp of the next data point from the same sensor, the sensor that generated the data point, and the engine speed or RPM of engine 110.

In step 720, processor 202 may determine the time between the selected data point and the next data point in time. Other embodiments may determine the time between the selected data point and the previous data point in time. The time between successive data points may be called DeltaT. DeltaT may be measured in seconds.

In step 725, processor 202 may load the engine speed or RPM of engine 110 at the time of the selected data point. In other embodiments, the engine speed or RPM may be determined to cover the span between the selected data point and next data point, or the selected data point and the previous data point. In still other embodiments, an average, weighted average, or predictive engine speed or RPM of engine 110 may be maintained and provided by step 725. Processor 202 may select a time from the average, weighted average, or predictive engine speed or RPM of engine 110 centered on the time of the selected data point.

In step 730, processor 202 may calculate the number of engine pulse events that occurred in DeltaT. One formula may be Pulses=(Min/60 Sec)*(Cylinders)*(Pulses/Rotation)*(RPM)*(DeltaT). RPM is rotations per minute. Alternatively, the number of samples taken during a pulse event may be calculated. In some exemplary embodiments, the sampling rate of the sensors may be determined based on the rotation speed of the crank shaft. One such exemplary embodiment may have at least ten samples per pulse event.

In step 735, processor 202 determines if all the data points associated with a pulse event are ready for transformation from the time domain to the combustion pulse domain. If not all the data points associated with a pulse event are ready for transformation from the time domain to the combustion pulse domain, processor 202 may next execute step 715 for the next data point in time. If all the data points associated with a pulse event are ready for transformation from the time domain to the combustion pulse domain, processor 202 may next execute step 740.

In step 740, processor 202 may linearly interpolate all the data points associated with a pulse event. Processor 202 may perform any additional steps or manipulations to prepare the selected data points for transformation into the combustion pulse domain. In one exemplary embodiment, when DeltaT is greater in time than the time between pulse events, a data point may be split into several data points to populate the time interval of the pulse event. This is sometimes called "boosting".

In step 745, processor 202 may transform the selected data points associated with a pulse event into the combustion pulse domain. In one exemplary embodiment, using the engine speed or RPM, sampling rate, time, and the starting time of the pulse event, each sample may be changed from a magnitude over time to a magnitude over pulse event. That is, the sample's position in the pulse event is known, and a set of samples may be manipulated in respect to their position within a pulse event or a series of pulse events. In a further embodiment, there may be 10 samples per pulse.

In step 750, processor 202 determines if the pulse events to model the virtual sensor in the combustion pulse domain are available. If there are more pulse events that need to be transformed into the combustion pulse domain, processor 202 may next execute step 715 for the next data point in time. If the pulse events that need to be transformed into the combustion pulse domain to model the virtual sensor in the combustion pulse domain are available, processor 202 may next execute step 755.

In step 755, processor 202 may input the data file, as converted into the combustion pulse domain, into the model to create a virtual sensor output. In some exemplary embodiments, the entire data file may have been transformed into the combustion pulse domain, and the model will output a set of outputs for those pulse events. In other exemplary embodiments, such as a near real-time or real-time virtual sensor, the input to the model of the virtual sensor may be additional pulse events in the combustion pulse domain. In these exemplary embodiments, the model is regularly receiving new data in the combustion pulse domain and outputting new virtual sensor data in the combustion pulse domain. In further exemplary embodiments, the virtual sensor model may perform its calculations using linear calculations, such as a decision tree model or linear equations.

In step 760, processor 202 may transform the output of the virtual sensor from the combustion pulse domain to the time domain. In some exemplary embodiments, an entire data file of virtual sensor model outputs may be transformed. In other exemplary embodiments, virtual sensor model outputs may be transformed back into the time domain as the virtual sensor produces the outputs, or periodically. In one exemplary embodiment, using the engine speed or RPM, sampling rate, time, and the starting time of the pulse event, each sample may be changed from a magnitude over pulse event to a magnitude over time. That is, if the sample's position in the pulse event is known, and the duration and start of a pulse event are also known, the samples may be transformed from the combustion pulse domain back to the time domain. In a further embodiment, there may be 10 samples per pulse.

In some further exemplary embodiments, the output of the virtual sensor may not only be transformed from the combustion pulse domain to the time domain, but a time lag may be imposed on the virtual sensor output. If the virtual sensor is modeling a sensor in the exhaust system, such as airborne $NO_x$ emissions levels in an internal combustion engine, the airborne emissions may take some duration of time to reach the location where the virtual sensor is modeling the airborne emissions. The speed at which airborne emissions travel through the exhaust system is a function, in part, of the number of pulse events. In one exemplary embodiment, most airborne emissions take one to seven seconds to travel from the engine and through the exhaust system. The virtual sensor output may have been generated by data points taken at the exhaust ports of engine 110, not the location of the virtual sensor modeling tailpipe emissions several feet away from the exhaust port along the gas flow path. Based on the frequency of pulse events, the time stamp of the virtual sensor data may be adjusted to when a physical sensor at the location of the virtual sensor would have indicated the value of the virtual sensor.

It should be noted that FIG. 7 is exemplary. Depending on circumstances, certain items in flowchart 700 may be omitted, other items may be added, and the order of the indicated items may vary. For example, in one exemplary embodiment, the virtual sensor may transform its output back into the time domain, and step 760 may be omitted. In another exemplary embodiment, the results of the virtual sensor may be used as inputs in the combustion pulse domain by other virtual sensors or by ECM 120, and step 760 may be omitted. In some exemplary embodiments, the process illustrated by flowchart 700 may be executed in real-time or near-real time, and the inputs and outputs may be constantly updated.

ECM 120 may obtain output parameters, such as $NO_x$ emissions level, at output 320, from virtual sensor network 130 via sensor output interface 308. ECM 120 may also obtain output parameters from a combination of physical sensors and virtual sensor models. Further, ECM 120 may receive alarm or other status information from virtual sensor network 130 to adjust control parameters provided by the physical sensors and virtual sensor models to achieve desired stability and reliability.

When multiple ECMs are included, processor 202 may obtain input information, such as input parameters, from the multiple ECMs simultaneously over a communications network coupling the multiple ECMs. Processor 202 may also communicate output information, such as output parameters, to the multiple ECMs simultaneously over the communications network.

INDUSTRIAL APPLICABILITY

The disclosed system and method may provide a computationally efficient solution for modeling virtual sensors, including virtual sensor models of airborne emissions. By knowing the average engine speed between two successive data points in the time domain and the architecture of engine 110, such as the number of strokes per combustion cycle, number of cylinders in engine 110, etc., the data points may be mathematically transformed from the time domain into the combustion pulse domain. Modeling virtual sensors in the combustion pulse domain may make the modeling task much easier and produce models that are both more accurate and of simpler form (decision trees or simple linear equations versus large nonlinear models).

The disclosed systems and methods may be useful to transform the virtual sensor outputs from the combustion pulse domain back into the time domain. The virtual sensor outputs then may be used by an ECM 120, other controllers, and/or computers in further calculation or for prognostics. Further, the virtual sensor output may have its time stamp adjusted to reflect the difference in time from when physical sensors 140 and 142 may have read the inputs to the virtual sensor model, and when the sensor being modeled by the virtual sensor may have read the output of the virtual sensor if the virtual sensor was a physical sensor 140.

The disclosed systems and methods may be useful in any engine 110 which may create airborne emissions. By reducing the number of physical sensors 140 required, points of failure may be reduced. Some airborne emissions sensors may be expensive and/or unreliable. Using a virtual sensor to model the airborne emissions has the additional advantage of using physical sensors 142 associated with the engine 110. If the virtual sensor model is sufficiently accurate, no physical sensors 140 may have to be used.

The disclosed systems and methods may also provide efficient methods to determine types and qualities of sensors in a product. By choosing appropriate types of sensors and appropriate qualities of sensors, product cost may be reduced and product quality may be increased. Further, a combination of physical sensors 140 and 142 and virtual sensors may be established to further improve product quality and reliability.

It will be apparent to those skilled in the art that various modifications and variations can be made in the system and method of this disclosure. Other embodiments of the present disclosure will be apparent to those skilled in the art from consideration of the specification and practice of the present disclosure. It is intended that the specification and examples be considered as exemplary only, with a true scope of the disclosed embodiments being indicated by the following claims.

What is claimed is:

1. A method for transforming machine sensor data between a time domain and an engine combustion pulse domain, comprising:
    determining a number of engine combustion pulse events in an engine per rotation of an element associated with the engine;
    determining a sampling rate per engine combustion pulse event;
    sampling one or more sensors at the sampling rate per engine combustion pulse event; and transforming, by at least one computer processor, the samples from the time domain into the engine combustion pulse domain.

2. The method according to claim 1, further including modeling a process in the engine combustion pulse domain based on the samples transformed into the engine combustion pulse domain.

3. The method according to claim 2, further including:
transforming an output of the modeled process into the time domain; and
providing the transformed output to a controller.

4. The method according to claim 3, wherein transforming the output of the modeled process into the time domain includes adjusting the output in the time domain to account for a speed at which airborne emissions travel through an exhaust system, based on the number of engine combustion pulse events per rotation of the element.

5. The method according to claim 2, wherein modeling the process includes producing an output that includes virtual sensor data.

6. The method according to claim 5, wherein the virtual sensor data include virtual sensor data on airborne emissions of the engine.

7. The method according to claim 1, wherein a sampling rate is at least ten samples per engine combustion pulse event.

8. A system for a machine including an engine with a rotary element, the system configured to transform machine sensor data between a time domain and an engine combustion pulse domain, comprising:
a sensor deployed on the machine;
an input interface configured to obtain data from the sensor deployed on the machine;
an output interface configured to provide data to a control system; and
a controller configured to:
determine a number of engine combustion pulse events in the engine per rotation of the rotary element;
determine a sampling rate per engine combustion pulse event;
sample the sensor at the sampling rate per engine combustion pulse event; and
transform the samples from the time domain into the engine combustion pulse domain by determining positions of the samples within the engine combustion pulse events.

9. The system according to claim 8, wherein the controller is further configured to model a process in the engine combustion pulse domain based on the samples transformed into the engine combustion pulse domain.

10. The system according to claim 9, wherein the controller is further configured to:
transform an output of the modeled process into the time domain; and
provide the transformed output to the controller.

11. The system according to claim 10, wherein the controller is further configured to adjust the output in the time domain to account for a speed at which airborne emissions travel through an exhaust system, based on the number of engine combustion pulse events per rotation of the rotary element.

12. The system according to claim 9, wherein an output of the modeled process includes virtual sensor data.

13. The system according to claim 12, wherein the virtual sensor data include virtual sensor data on airborne emissions of the engine.

14. The system according to claim 8, wherein a sampling rate is at least ten samples per pulse event.

15. A machine, comprising:
an engine with a rotating element configured to provide power for the machine;
an engine electronic control module (ECM) configured to control the engine;
a plurality of physical sensors configured to provide sensing data to the engine ECM;
an input interface configured to obtain data from the plurality of physical sensors deployed on the machine;
an output interface configured to provide data to a control system; and
a controller associated with the ECM and being configured to:
determine a number of engine combustion pulse events in the engine per rotation of the rotating element;
determine a sampling rate per engine combustion pulse event;
sample one or more of the physical sensors at the sampling rate per engine combustion pulse event;
transform the samples from a time domain into an engine combustion pulse domain by determining positions of the samples within the engine combustion pulse events; and
provide the transformed samples as input to a virtual sensor model.

16. The machine according to claim 15, wherein the controller is further configured to:
transform an output of the virtual sensor model into the time domain; and
provide transformed output to the ECM.

17. The machine according to claim 16, wherein the controller is further configured to adjust the output in the time domain to account for a speed at which airborne emissions travels through an exhaust system, based on the number of pulse events per rotation of the rotating element.

18. The machine according to claim 15, wherein the output of the virtual sensor model includes virtual sensor data on airborne emissions in an internal combustion engine.

19. The machine according to claim 15, wherein a sampling rate per pulse event includes at least ten samples per pulse event.

* * * * *